US012644409B2

(12) United States Patent
Stratton

(10) Patent No.: US 12,644,409 B2
(45) Date of Patent: Jun. 2, 2026

(54) METHOD FOR MAPPING CONTRAIL FORMATION TO ENGINE PERFORMANCE CHARACTERISTICS

(71) Applicant: Pratt & Whitney Canada Corp., Longueuil (CA)

(72) Inventor: Russell Stratton, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 218 days.

(21) Appl. No.: 18/339,286

(22) Filed: Jun. 22, 2023

(65) Prior Publication Data

US 2024/0426241 A1 Dec. 26, 2024

(51) Int. Cl.
*F02C 3/30* (2006.01)
*G01W 1/08* (2006.01)

(52) U.S. Cl.
CPC ................. *F02C 3/30* (2013.01); *G01W 1/08* (2013.01); *F05D 2270/083* (2013.01)

(58) Field of Classification Search
CPC .... F02C 3/30; F02C 9/28; G01W 1/08; F05D 2270/083

(Continued)

(56) References Cited

U.S. PATENT DOCUMENTS 5,005,355 A * 4/1991 Singh ......................... F02C 3/30
60/264
9,002,660 B2 * 4/2015 Mannstein ............. B64D 47/08
702/30

(Continued)

FOREIGN PATENT DOCUMENTS

GB 2524774 A * 10/2015 ............ B64C 15/12
RU 2286588 C2 10/2006
RU 2467360 C1 11/2012

OTHER PUBLICATIONS

Schumann, Ulrich. "Influence of propulsion efficiency on contrail formation." Aerospace science and technology 4.6 (2000): 391-401. (Year: 2000).*

(Continued)

*Primary Examiner* — Matthias S Weisfeld
*Assistant Examiner* — Keith A von Volkenburg
(74) *Attorney, Agent, or Firm* — CANTOR COLBURN LLP

(57) ABSTRACT

A computer system includes a processor controls the computer system to perform a computer-implemented method of determining a minimum humidity required for formation and persistence of contrails produced by an engine of an aircraft. The computer-implemented method includes determining engine performance model parameters of the engine at desired operating conditions with zero humidity; determining additional energy flow out of the engine; and determining an exhaust plume temperature scaling factor. The method further comprises determining a contrail engine efficiency parameter (noverall_λ) based on additional energy flow out of the engine and the exhaust plume temperature scaling factor; and generating an improved Schmidt-Appleman equation based on the contrail engine efficiency parameter (noverall_λ). The method further includes determining an improved mixing line slope based on the improved Schmidt-Appleman equation; and determining the minimum humidity required for formation and persistence of contrails produced by the engine based on the improved mixing line slope.

20 Claims, 9 Drawing Sheets

(58) Field of Classification Search
USPC .......................................................... 701/99
See application file for complete search history.

(56) References Cited

U.S. PATENT DOCUMENTS

| | | | |
|---|---|---|---|
| 9,251,710 B2 * | 2/2016 | Wang ...................... G08G 5/56 |
| 9,399,521 B2 * | 7/2016 | Swann ................... B64D 31/06 |
| 9,650,968 B2 * | 5/2017 | Swann ...................... F02C 9/28 |
| 10,371,003 B2 | 8/2019 | Swann et al. |
| 11,530,651 B2 | 12/2022 | Madden et al. |
| 11,643,975 B2 * | 5/2023 | Becoulet ............. F16H 57/0427 475/159 |
| 2010/0043443 A1 * | 2/2010 | Noppel ..................... F02K 1/52 60/39.5 |
| 2010/0132330 A1 * | 6/2010 | Noppel .................. F01D 25/30 250/492.1 |
| 2012/0130564 A1 * | 5/2012 | Narasimhulu ......... G01C 23/00 701/3 |
| 2012/0173147 A1 * | 7/2012 | Mannstein ............. B64D 45/00 702/3 |
| 2013/0085660 A1 * | 4/2013 | Wang ...................... G08G 5/56 701/120 |
| 2015/0100220 A1 * | 4/2015 | Swann ...................... F02C 9/28 701/100 |
| 2022/0235716 A1 * | 7/2022 | Swann ...................... F02C 9/28 |
| 2022/0403790 A1 * | 12/2022 | Fletcher ................... F02C 6/00 |
| 2024/0257653 A1 * | 8/2024 | Lee .......................... G08G 5/53 |

OTHER PUBLICATIONS

Schumann, Ulrich. "On conditions for contrail formation from aircraft exhausts." Meteorologische Zeitschrift 5 (1996): 4-23. (Year: 1996).*
Dischl, Rebecca & Kaufmann, Stefan & Voigt, Christiane. (2022). Regional and Seasonal Dependence of the Potential Contrail Cover and the Potential Contrail Cirrus Cover over Europe. Aerospace. 9. 485. 10.3390/aerospace9090485. (Year: 2022).*
Haglind "Potential of lowering the contrail formation of aircraft exhausts by engine re-design" Aerospace Science and Technology 12.6 (Sep. 2008) pp. 490-497.
Schumann "Formation, properties and climatic effects of contrails" Comptes Rendus Physique 6.4-5 (May 2005) pp. 549-565.
Search Report issued in European Patent Application No. 24183561. 0; Date of Mailing Dec. 2, 2024 (13 pages).

* cited by examiner

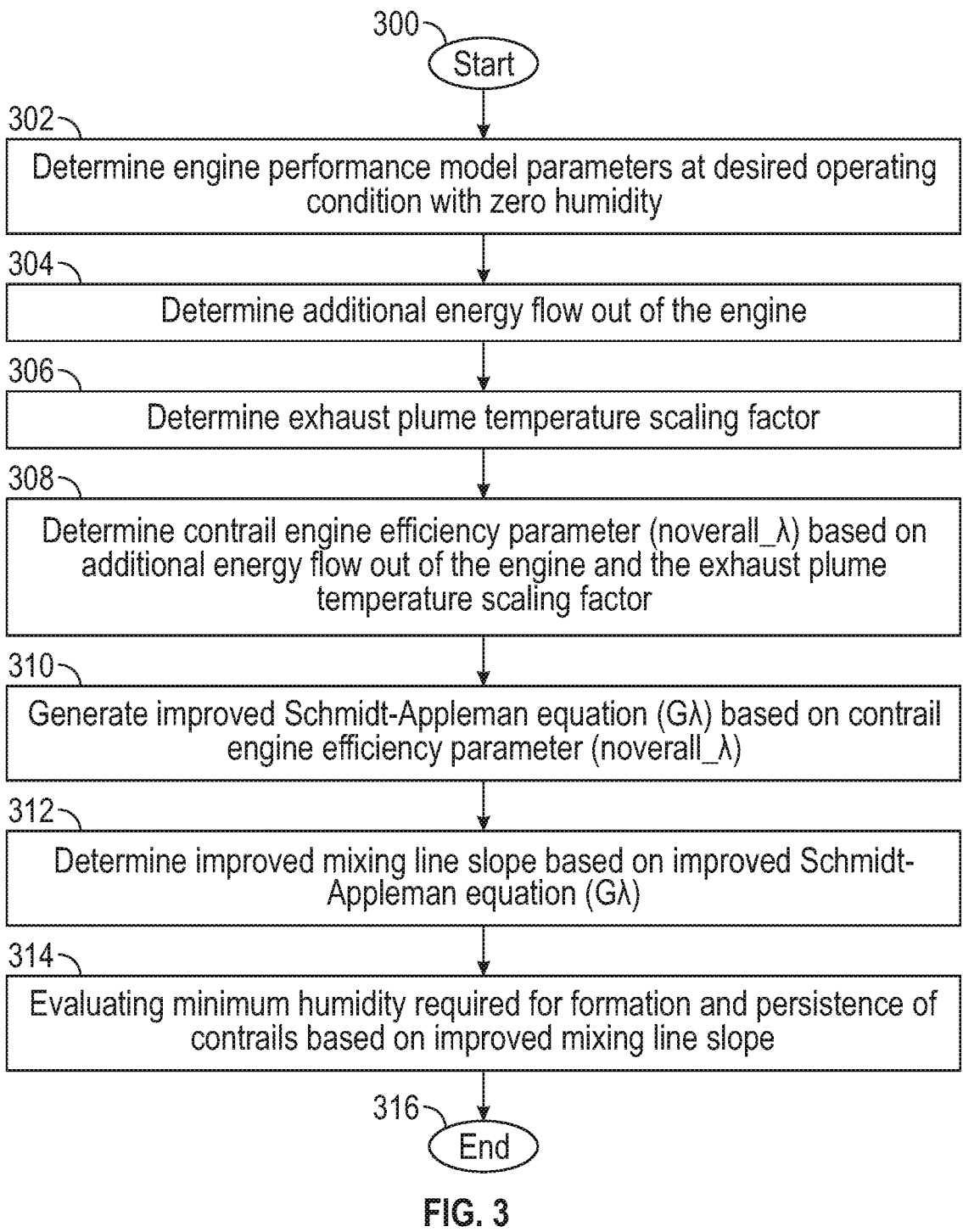

300 — Start

302 — Determine engine performance model parameters at desired operating condition with zero humidity 304 — Determine additional energy flow out of the engine 306 — Determine exhaust plume temperature scaling factor 308 — Determine contrail engine efficiency parameter (noverall_λ) based on additional energy flow out of the engine and the exhaust plume temperature scaling factor 310 — Generate improved Schmidt-Appleman equation (Gλ) based on contrail engine efficiency parameter (noverall_λ)

312 — Determine improved mixing line slope based on improved Schmidt-Appleman equation (Gλ)

314 — Evaluating minimum humidity required for formation and persistence of contrails based on improved mixing line slope 316 — End

FIG. 3

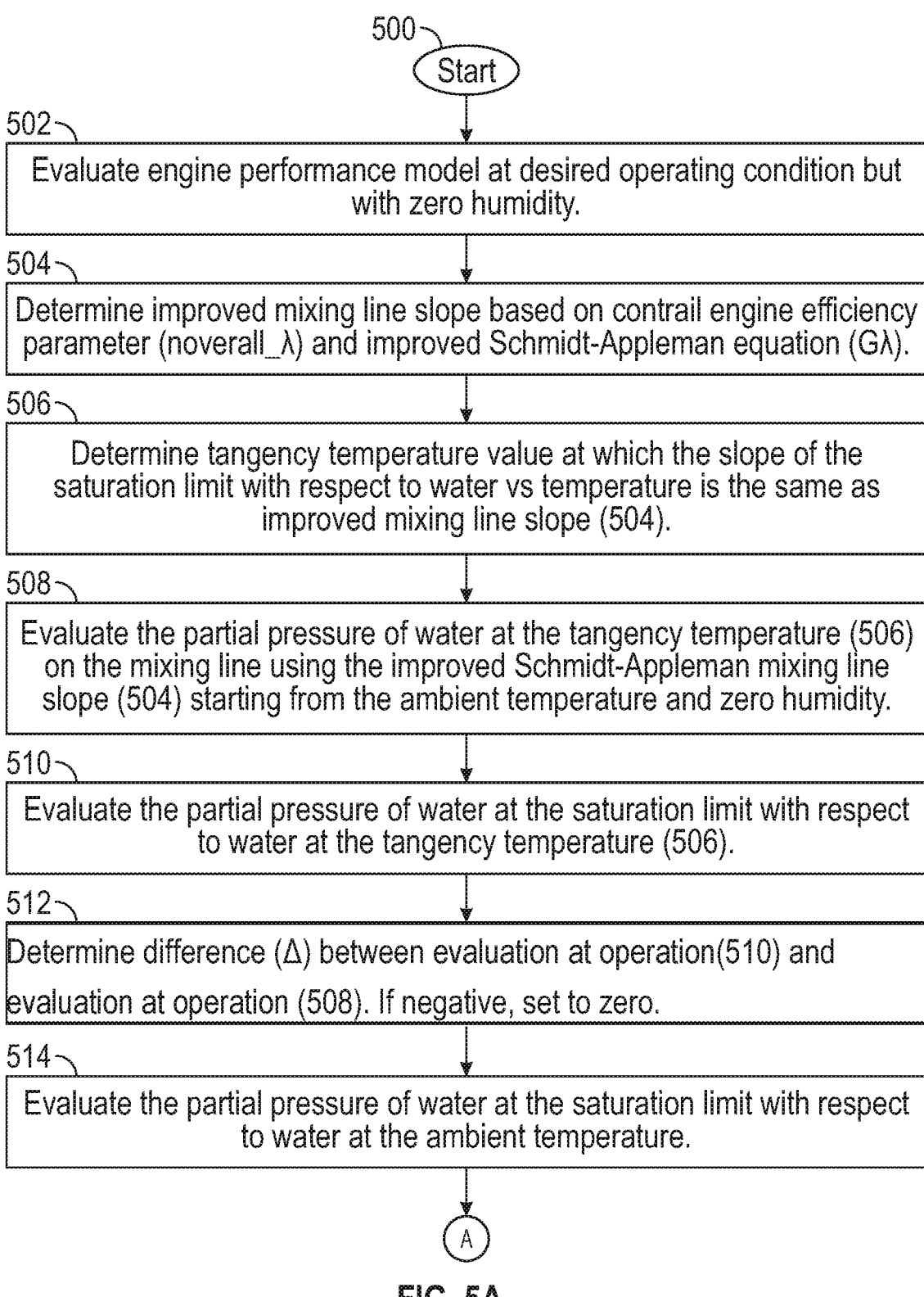

500

Start

502
Evaluate engine performance model at desired operating condition but with zero humidity.

504
Determine improved mixing line slope based on contrail engine efficiency parameter (noverall_λ) and improved Schmidt-Appleman equation (Gλ).

506
Determine tangency temperature value at which the slope of the saturation limit with respect to water vs temperature is the same as improved mixing line slope (504).

508
Evaluate the partial pressure of water at the tangency temperature (506) on the mixing line using the improved Schmidt-Appleman mixing line slope (504) starting from the ambient temperature and zero humidity.

510
Evaluate the partial pressure of water at the saturation limit with respect to water at the tangency temperature (506).

512
Determine difference (Δ) between evaluation at operation(510) and evaluation at operation (508). If negative, set to zero.

514
Evaluate the partial pressure of water at the saturation limit with respect to water at the ambient temperature.

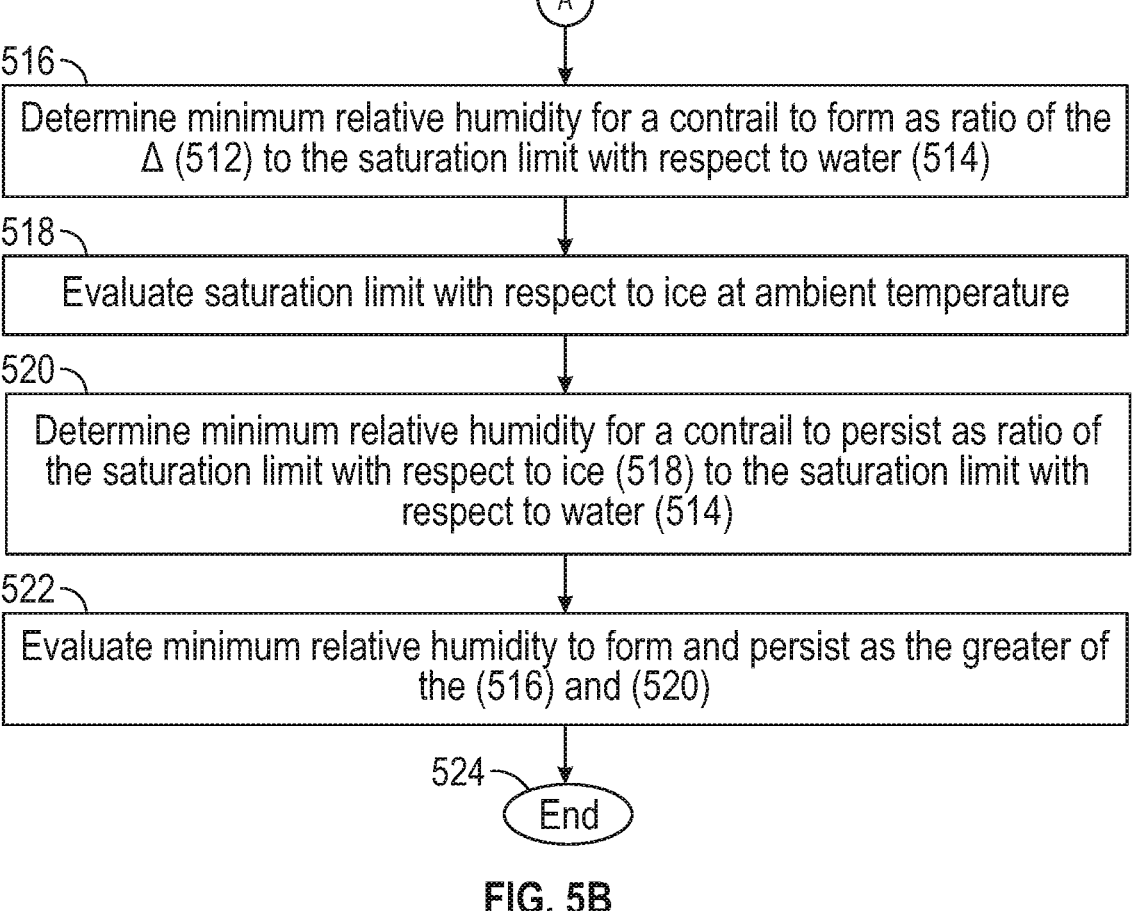

516 — Determine minimum relative humidity for a contrail to form as ratio of the Δ (512) to the saturation limit with respect to water (514)

518 — Evaluate saturation limit with respect to ice at ambient temperature

520 — Determine minimum relative humidity for a contrail to persist as ratio of the saturation limit with respect to ice (518) to the saturation limit with respect to water (514)

522 — Evaluate minimum relative humidity to form and persist as the greater of the (516) and (520)

524 — End

FIG. 5B

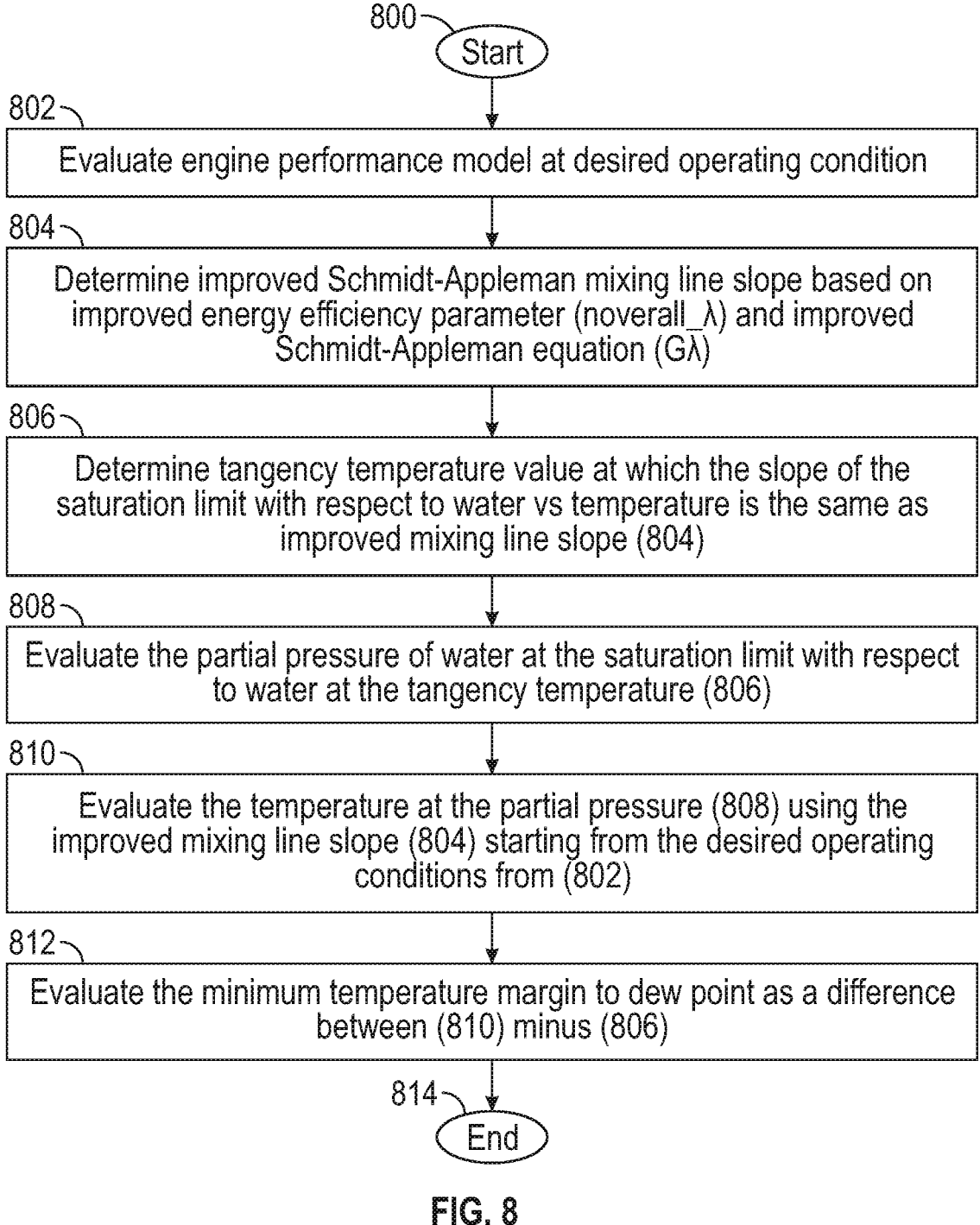

800 — Start

802 — Evaluate engine performance model at desired operating condition

804 — Determine improved Schmidt-Appleman mixing line slope based on improved energy efficiency parameter (noverall_$\lambda$) and improved Schmidt-Appleman equation (G$\lambda$)

806 — Determine tangency temperature value at which the slope of the saturation limit with respect to water vs temperature is the same as improved mixing line slope (804)

808 — Evaluate the partial pressure of water at the saturation limit with respect to water at the tangency temperature (806)

810 — Evaluate the temperature at the partial pressure (808) using the improved mixing line slope (804) starting from the desired operating conditions from (802)

812 — Evaluate the minimum temperature margin to dew point as a difference between (810) minus (806)

814 — End

FIG. 8

METHOD FOR MAPPING CONTRAIL FORMATION TO ENGINE PERFORMANCE CHARACTERISTICS

BACKGROUND

This present disclosure relates to aircraft engine performance characteristics, and more particularly, to contrail formation based on engine performance.

Aircraft contrails are an important contributor to climate change. Contrails both trap outgoing radiation from the earth and reflect incoming radiation from the sun. On a global basis, contrails have been found to have a net warming impact, meaning that they trap more energy than they reflect, but each individual contrail is different. Contrails form when exhaust gases locally exceed the water saturation limit while mixing and cooling to ambient conditions. However, recent research has shown that only approximately 20% of flights globally produce contrails, and furthermore, that less than 10% of flights account for 80% of the global climate warming from contrails. This leads to the conclusion that a fleetwide action is not necessary and that targeted action to mitigate contrail production by worst offenders is most appropriate.

BRIEF DESCRIPTION

According to a non-limiting embodiment, a computer system includes a processor having memory storing instruction, which when executed by the processor, controls the computer system to perform a computer-implemented method of determining a minimum humidity required for formation and persistence of contrails produced by an engine of an aircraft. The computer-implemented method includes determining engine performance model parameters of the engine at desired operating conditions with zero humidity; determining additional energy flow out of the engine; and determining an exhaust plume temperature scaling factor. The method further comprises determining a contrail engine efficiency parameter (noverall_$\lambda$) based on additional energy flow out of the engine and the exhaust plume temperature scaling factor; and generating an improved Schmidt-Appleman equation (G$\lambda$) based on the contrail engine efficiency parameter (noverall_$\lambda$). The method further includes determining an improved mixing line slope based on the improved Schmidt-Appleman equation (G$\lambda$); and determining the minimum humidity required for formation and persistence of contrails produced by the engine based on the improved mixing line slope.

In addition to one or more of the features described above, or as an alternative to any of the foregoing embodiments, the engine performance model parameters include a residual fuel energy in the aircraft engine.

In addition to one or more of the features described above, or as an alternative to any of the foregoing embodiments, the controller determines the residual fuel energy in the aircraft engine based on the contrail engine efficiency parameter (noverall_$\lambda$).

In addition to one or more of the features described above, or as an alternative to any of the foregoing embodiments, the exhaust plume temperature scaling factor is 0.5.

In addition to one or more of the features described above, or as an alternative to any of the foregoing embodiments, the additional energy flow includes power extraction and bleed offtakes used by an aircraft air management system and an electrical system of the aircraft.

According to a another non-limiting embodiment, a computer system includes a processor having memory storing instruction, which when executed by the processor, controls the computer system to perform a computer-implemented method to generate contrail formation and persistence maps by evaluating the minimum humidity required for formation and persistence over the engine operating envelope of a given aircraft engine. The computer-implemented method comprises determining engine performance model parameters of the engine at desired operating conditions with zero humidity; determining a contrail engine efficiency parameter (noverall_$\lambda$); determining an improved Schmidt-Appleman equation (G$\lambda$) based on the contrail engine efficiency parameter (noverall_$\lambda$); determining an improved mixing line slope based on the contrail engine efficiency parameter (noverall_$\lambda$) and the improved Schmidt-Appleman equation (G$\lambda$); determining a tangency temperature value at which the slope of a first saturation limit with respect to water vs temperature is the same as the improved mixing line slope; determining a first partial pressure of water value at the tangency temperature based on the improved Schmidt-Appleman mixing line slope; determining a second partial pressure of water value at a second saturation limit with respect to water at the tangency temperature; determining a difference ($\Delta$) between the second partial pressure of water and the first partial pressure of water value; determining a third partial pressure of water at a third saturation limit with respect to water at the ambient temperature; determining a minimum relative humidity for a contrail to form as a first ratio of the difference ($\Delta$) with respect to water; determine a fourth saturation limit with respect to ice at the ambient temperature; determining a minimum relative humidity for the contrail to persist as a second ratio of the fourth saturation limit to the third saturation limit; and determining the minimum relative humidity to form and persist as the greater of the first ratio and the second ratio.

In addition to one or more of the features described above, or as an alternative to any of the foregoing embodiments, the engine performance model parameters include a residual fuel energy in the aircraft engine.

In addition to one or more of the features described above, or as an alternative to any of the foregoing embodiments, the controller determines the residual fuel energy in the aircraft engine based on the contrail engine efficiency parameter (noverall_$\lambda$).

In addition to one or more of the features described above, or as an alternative to any of the foregoing embodiments, the exhaust plume temperature scaling factor is 0.5.

In addition to one or more of the features described above, or as an alternative to any of the foregoing embodiments, the additional energy flow includes power extraction and bleed offtakes used by an aircraft air management system and an electrical system of the aircraft.

In addition to one or more of the features described above, or as an alternative to any of the foregoing embodiments, determining the first partial pressure of water value is based on the improved Schmidt-Appleman mixing line slope starting from an ambient temperature and zero humidity.

In addition to one or more of the features described above, or as an alternative to any of the foregoing embodiments, determining the difference ($\Delta$) is set to zero when the difference ($\Delta$) is negative.

In addition to one or more of the features described above, or as an alternative to any of the foregoing embodiments, the processor computes the tangency temperature value is analytically.

In addition to one or more of the features described above, or as an alternative to any of the foregoing embodiments, the processor computes the tangency temperature value is numerically.

According to another non-limiting embodiment, a computer system includes a processor having memory storing instruction, which when executed by the processor, controls the computer system to perform a computer-implemented method of determining a minimum humidity necessary to form contrails by an engine of an aircraft. The computer-implemented method comprises: determining engine performance model parameters of the engine at desired operating conditions; determining a contrail engine efficiency parameter (noverall_$\lambda$); determining an improved Schmidt-Appleman equation (G$\lambda$) based on the contrail engine efficiency parameter (noverall_$\lambda$); determining an improved mixing line slope based on the contrail engine efficiency parameter (noverall_$\lambda$) and the improved Schmidt-Appleman equation (G$\lambda$); determining a tangency temperature value at which the slope of a first saturation limit with respect to water vs temperature is the same as the improved mixing line slope; determining a partial pressure of water at the first saturation limit with respect to water at the tangency temperature; determining a first temperature at the partial pressure of water based on the improved mixing line slope; determining a minimum temperature margin with respect to dew point based on the temperature at the partial pressure and the tangency temperature value; and determining the minimum humidity necessary to form contrails by the engine based on the minimum temperature margin with respect to the dew point.

In addition to one or more of the features described above, or as an alternative to any of the foregoing embodiments, determining the temperature at the partial pressure of water includes determining the temperature at the partial pressure of water starting from the desired operating conditions.

In addition to one or more of the features described above, or as an alternative to any of the foregoing embodiments, the contrail engine efficiency parameter (noverall_$\lambda$) comprises: determining an exhaust plume temperature scaling factor that scales a kinetic energy of the engine by a factor 0.5; and applying the exhaust plume temperature scaling factor to the contrail engine efficiency parameter (noverall_$\lambda$).

In addition to one or more of the features described above, or as an alternative to any of the foregoing embodiments, the minimum temperature margin with respect to dew point is a difference between the temperature at the partial pressure and the tangency temperature.

In addition to one or more of the features described above, or as an alternative to any of the foregoing embodiments, the processor computes the tangency temperature value is analytically.

In addition to one or more of the features described above, or as an alternative to any of the foregoing embodiments, the processor computes the tangency temperature value is numerically.

BRIEF DESCRIPTION OF THE DRAWINGS

The following descriptions should not be considered limiting in any way. With reference to the accompanying drawings, like elements are numbered alike.

4

Figures 1, 2:
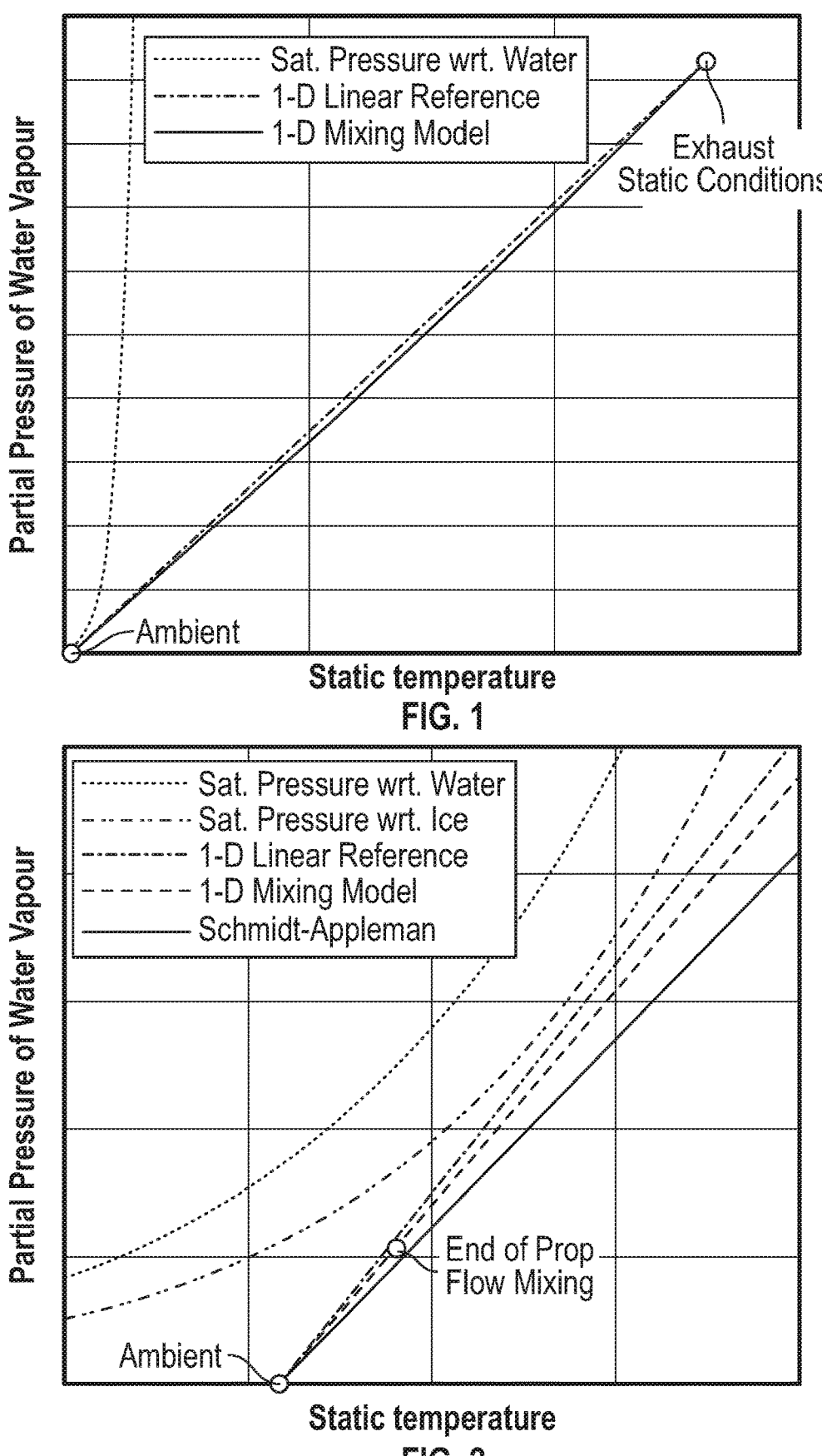
FIG. 1 depicts a traditional mixing line slope plotted on a graph illustrating the relationship between partial pressure of water vapor versus static temperature, commencing at the exhaust conditions of the engine.
Figure 4:
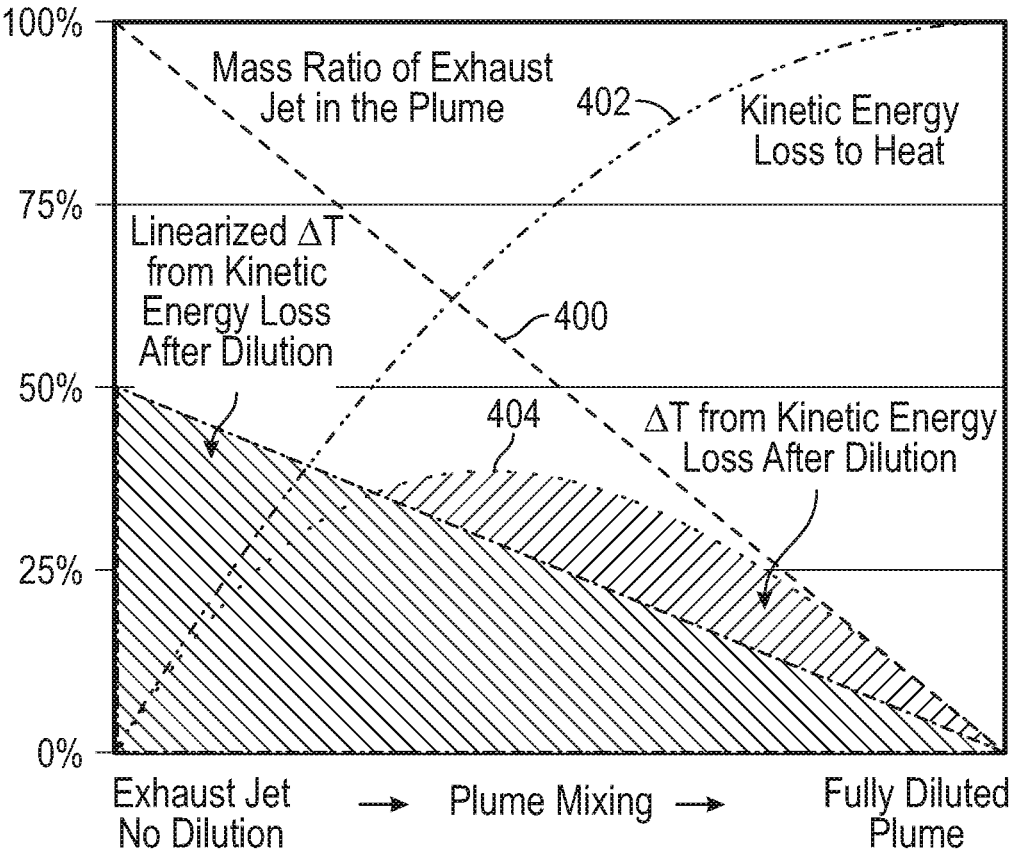
Figures 6, 7:
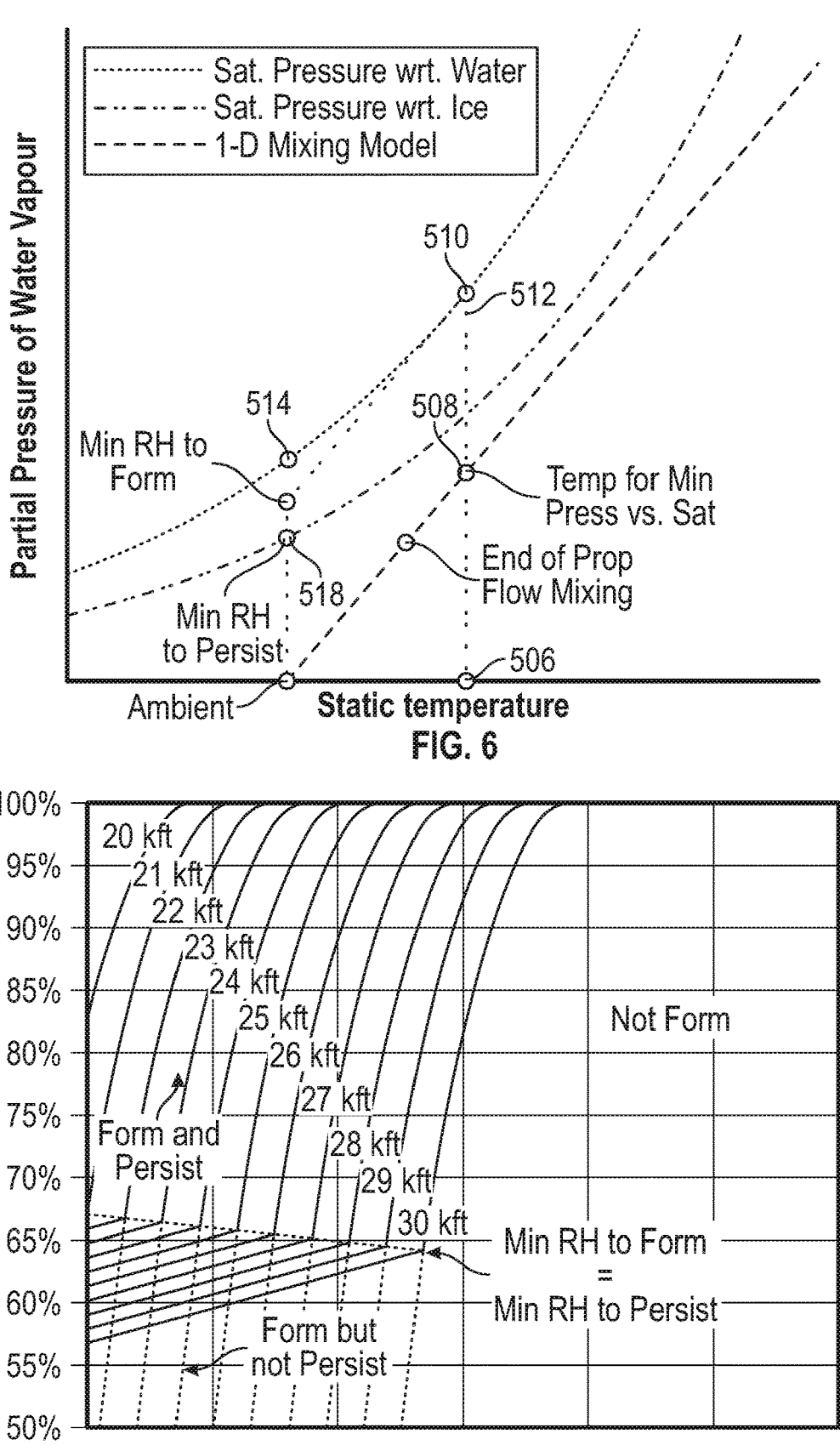
Figure 9:
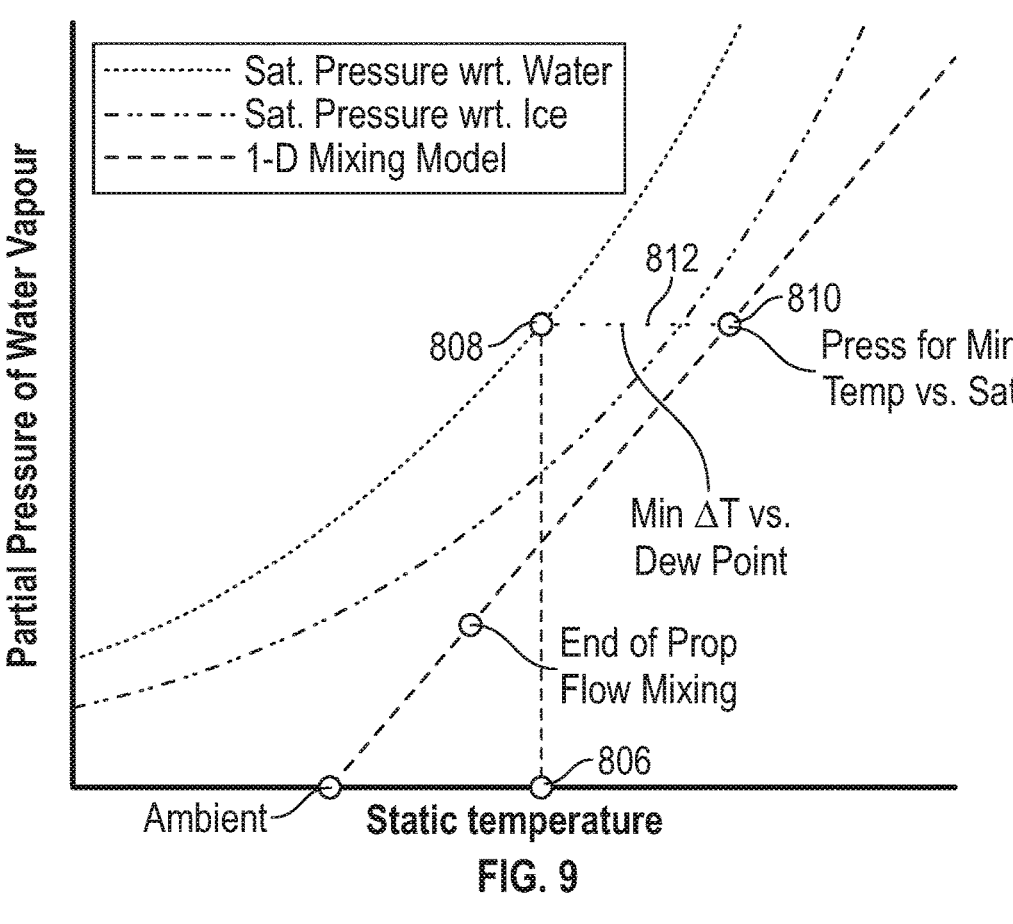
Figure 10:
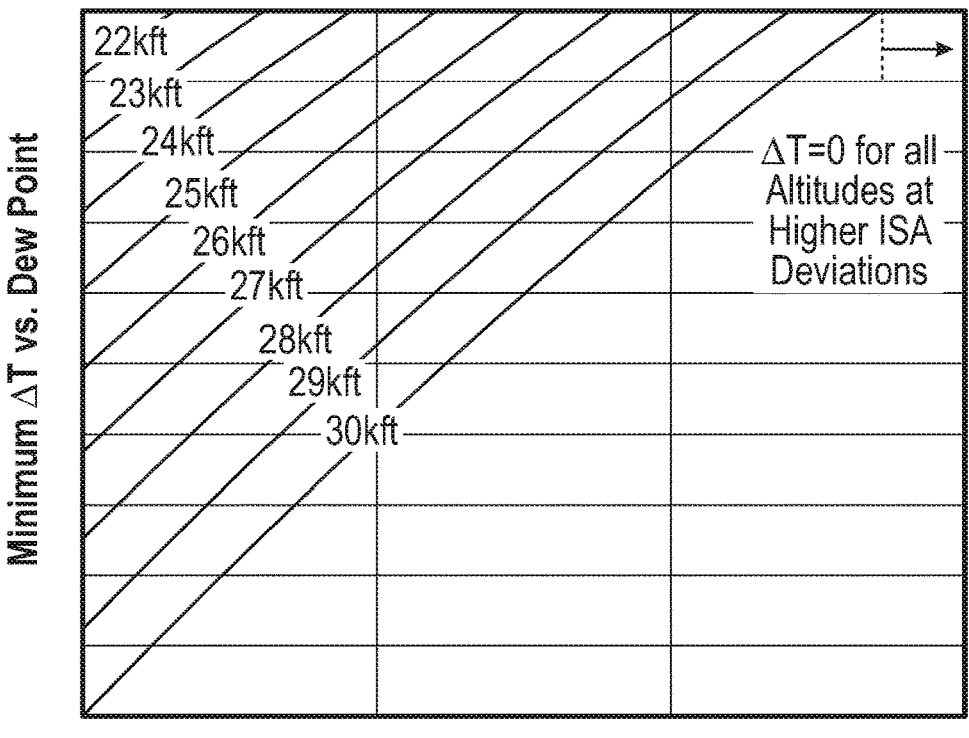
Figure 11:
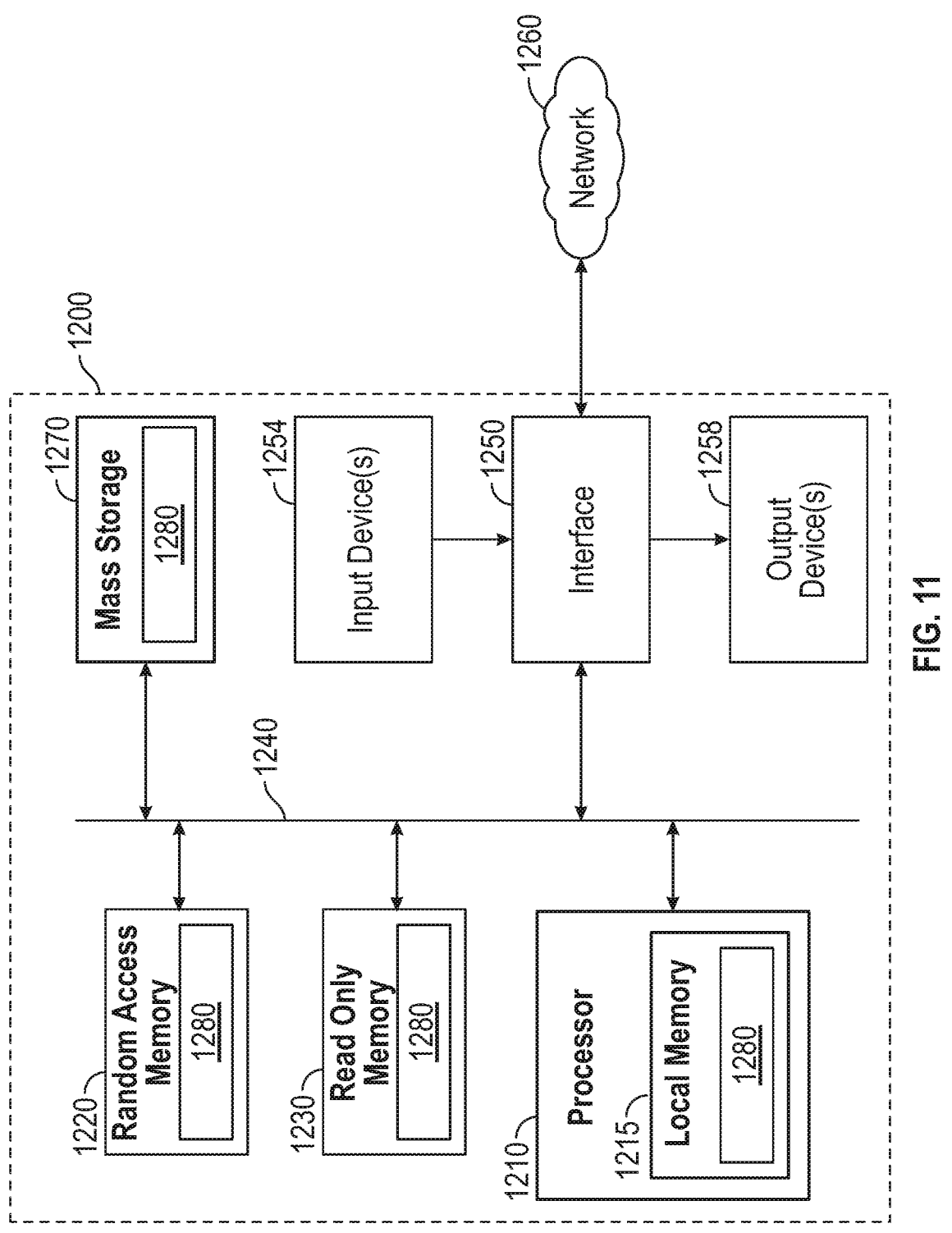

FIG. 2 depicts a traditional mixing line slope plotted on a graph illustrating the relationship between partial pressure of water vapor versus static temperature, zoomed in on the range near ambient conditions;

FIG. 3 is a flow diagram illustrating a method of determining an improved relationship of partial pressure of water with respect to temperature in an engine plume of an aircraft according to a non-limiting embodiment of the present disclosure;

FIG. 4 is a diagram illustrating the effect a scaling factor included in a contrail engine efficiency parameter (noverall_$\lambda$) has on aircraft engine on a normalized scale according to a non-limiting embodiment of the present disclosure;

FIGS. 5A and 5B are a flow diagram illustrating a method of determining a minimum humidity necessary to form contrails according to a non-limiting embodiment;

FIG. 6 is a graph depicting the relationships between various operations included in the method shown in FIGS. 5A and 5B according to a non-limiting embodiment;

FIG. 7 depicts maps generated by the method of FIGS. 5A and 5B indicating the formation and persistence humidity thresholds versus altitude across the envelope of the aircraft engine according to a non-limiting embodiment;

FIG. 8 is a flow diagram illustrating a method of determining a minimum humidity necessary to form contrails by a given aircraft engine according to a non-limiting embodiment;

FIG. 9 is a graph depicting the relationships between various operations included in the method shown in FIG. 8 according to a non-limiting embodiment;

FIG. 10 depicts maps generated by the method of FIG. 8 which indicate a minimum temperature margin to dew point versus altitude over the engine operating envelope of the aircraft engine according to a non-limiting embodiment; and FIG. 11 depicts a block diagram of an example processing system configured to execute the example machine readable instructions according to non-limiting embodiments of the present disclosure.

DETAILED DESCRIPTION

A detailed description of one or more embodiments of the disclosed apparatus and method are presented herein by way of exemplification and not limitation with reference to the figures.

Contrails form when cooling and diluting engine exhaust exceeds the saturation pressure with respect to water, and the persist when humidity exceeds saturation pressure with respect to ice. Contrail formation is generally defined using the "Schmidt-Appleman Criterion," and can be expressed according to the following equation referred to as the "Schmidt-Appleman equation":

$$\text{Mixing line slope} = G\left[\frac{\text{psi}}{^\circ \text{F.}}\right] =$$

$$\frac{e_p - e_E}{T_p - T_E} \approx \frac{\left[\frac{w_f \cdot EI_{H_2O}}{w_a} \cdot \frac{P_{amb}}{\varepsilon}\right]}{\left[\frac{w_f \cdot LHV}{w_a} \cdot \frac{(1 - \eta_{overall})}{C_p}\right]} = \frac{C_p \cdot P_{amb}}{\varepsilon} \cdot \frac{1}{(1 - \eta_{overall})} \cdot \frac{EI_{H_2O}}{LHV}$$

where, ep/E=partial pressure of water in plume/exhaust (psi);
Tp/E=total temperature in plume/exhaust ($^\circ$ R);
wa/f=mass flow rate of air/fuel in the plume (lbm/s);

$EI_{H2O}$=emissions index of water (lbwater/lbfuel);

$P_{amb}$=ambient pressure (psi);

$\varepsilon$=water-to-air molar mass ratio (0.622);

LHV=lower heating value of fuel (BTU/lbm);

(1−ηoverall)=aircraft engine residual fuel energy; and $C_p$=Local heat capacity of plume (BTU/lb/R)=f(T, FAR,RH)

The Schmidt-Appleman equation approximates the change in partial pressure of water vs temperature in the plume as exhaust gases mix with ambient air and cool to ambient conditions. The relationship of partial pressure of water with respect to temperature in the plume is referred to as the "mixing line", or the "mixing line slope" (G[psi/° F.]). The saturation limit of air with respect to water and ice can both be defined in terms of partial pressure of water vapor versus static temperature. The partial pressure of water vapor can be expressed as a molecular fraction of water in the air multiplied by the surrounding air pressure. FIG. 1 is a graph illustrating the relationship between partial pressure of water vapor versus static temperature.

Traditionally, the Schmidt-Appleman equation utilizes an energy efficiency parameter (ηoverall) to determine an aircraft residual fuel energy (1−ηoverall), or the amount of energy spent moving the aircraft. The energy efficiency parameter (ηoverall) is traditionally expressed according to the following equation:

$$\eta_{overall} = \frac{T \cdot V}{\dot{m}_f \cdot LHV} \cdot \frac{1}{778.17}$$

where, T=engine thrust (lbf);

V=forward flight velocity of the aircraft (ft/s);

$\dot{m}_f$=mass flow rate of fuel (lbm/s);

LHV=lower heating value of fuel (BTU/lbm); and

1 BTU=778.17 ft-lbf

However, the traditional energy efficiency parameter (ηoverall) does not take into account either: (1) additional energy that flows out of the engine such as, for example, power extraction and bleed offtakes used by the aircraft air management system and electrical systems; and (2) how the exhaust plume temperature is affected by the simultaneous kinetic energy loss to heat and cooling to ambient temperature due to dilution. As a result, the traditional efficiency parameter (ηoverall) provides poor alignment with the results of the physics-based 1-dimensions plume model, and reduces the accuracy of mixing line slope generated according to the traditional Schmidt-Appleman equation as illustrated by the graph depicted in FIG. 2.

One or more non-limiting embodiments of the present disclosure provide a method for mapping contrail formation to engine performance characteristics to rapidly developing engine-specific contrail formation maps. The method includes determining an contrail engine efficiency parameter (ηoverall_λ), which takes into account: (1) other energy that flows out of the engine such as, for example, power extraction and bleed offtakes used by the aircraft air management system and electrical systems; and (2) how the exhaust plume temperature is affected by the simultaneous kinetic energy loss to heat and cooling to ambient temperature due to dilution. Accordingly, an improved mixing line slope" (Gλ[psi/° F.]) can be determined using the contrail engine efficiency parameter (noverall_λ) to develop engine-specific contrail formation maps having improved precision and accuracy compared to contrail maps generated according to the traditional Schmidt-Appleman equation. The maps include minimum humidity for contrail formation and persistence that can be combined with engine operating conditions, atmospheric data, and contrail climate impact models to identify conditions of targeted contrail avoidance.

With reference now to FIG. 3, a method of determining an improved relationship of partial pressure of water with respect to temperature in an engine plume of an aircraft is illustrated according to a non-limiting embodiment of the present disclosure. The improved relationship can be utilized to determine a minimum humidity required for formation and persistence of contrails produced by an aircraft engine.

The method begins at operation 300, and engine performance model parameters of a given aircraft engine at desired (i.e., target) operating conditions with zero humidity are determined at operation 302. The engine performance model parameters include, but are not limited to, mass flow rate of air per fuel in the plume (wa/f), lower heating value of fuel (LHV), local heat capacity of plume ($C_p$), and residual fuel energy in the aircraft engine (1−ηoverall_λ). As described herein, the residual fuel energy in the aircraft engine (1−ηoverall_λ) is determined using an contrail engine efficiency parameter (ηoverall_λ), which is described in greater detail below. The desired operating conditions include, but are not limited to, partial pressure of water in plume per exhaust (ep/E), total temperature in plume per exhaust (Tp/E), emissions index of water ($EI_{H2O}$), ambient pressure ($P_{amb}$), and water-to-air molar mass ratio ($\varepsilon$).

At operation 304, the energy flow parameter indicative of additional energy in the jet exhaust is determined, which takes into account the mass flow rate of the jet exhaust at engine nozzle ($\dot{m}_j$), enthalpy of the jet exhaust at engine nozzle ($h_j$), enthalpy of the engine inlet flow (hi), and axial and tangential velocity of the plume relative to the engine ($V_{Aj}/V_{Tj}$), and forward flight velocity of the aircraft (V). Accordingly, the additional energy flow parameter for energy in the jet exhaust can be determined according to the following equation, which includes parameters for the mass flow rate of bleed air ($\dot{m}b$), the enthalpy of bleed air (hb), the mass flow rate of fuel ($\dot{m}f$), the lower hearing value of the fuel (LHV), and power extraction from the engine ($Q_{HPX}$):

$$(\dot{m}_j + \dot{m}_b) \cdot + \dot{m}_f \cdot LHV =$$
$$\dot{m}_j \cdot \left(h_j + \frac{1}{2}((V_{Aj} - V)^2 + V_{Tj}^2)\right) + \dot{Q}_{HPX} + \dot{m}_b \cdot h_b +$$
$$\dot{m}_j \cdot (V_{Aj} - V) \cdot V \text{ where } \left(h_j + \frac{1}{2}((V_{Aj} - V)^2 + V_{Tj}^2)\right)$$

expresses Energy IN=Energy OUT

The equation above can be solved to express the additional energy flow parameters as follows:

$$\dot{m}_j \cdot (V_{Aj} - V) \cdot V =$$
$$\dot{m}_f \cdot LHV - \dot{m}_j \cdot \left(h_j - h_i + \frac{1}{2}((V_{Aj} - V)^2 + V_{Tj}^2)\right) - \dot{Q}_{HPX} - \dot{m}_b \cdot (h_b - h_i)$$

where:

$(V_{Aj}-V) \cdot V$, expresses Propulsive Power;

$\dot{m}_f \cdot LHV - \dot{m}_b$, expresses Fuel Energy;

$h_j - h_i + \frac{1}{2}((V_{Aj}-V)^2 + V_{Tj}^2)$, expresses Energy in jet exhaust; and $Q_{HPX} - \dot{m}_b \cdot (h_b - h_i)$, expresses Energy to installation losses At operation 306, an exhaust plume temperature scaling factor (k) is set. As described herein, the exhaust plume temperature scaling factor (k) scales the kinetic energy ($\frac{1}{2}((V_{Aj}-V)^2+(V_{TJ})^2)$) of the aircraft engine by a factor 0.5, which takes into account how the exhaust plume temperature is affected by the simultaneous kinetic energy loss to heat and cooling to ambient temperature due to dilution.

Referring to FIG. 4, for example, a diagram illustrates how the scaling factor scales the aircraft engine on a normalized scale. At the exhaust nozzle, no kinetic energy loss has occurred and the plume is undiluted. As ambient air is mixed into the plume, temperature and velocity are linearly reduced with the mass ratio of the jet to overall plume (orange curve 400). Kinetic energy loss to heat occurs with the square of velocity reduction; heat is gained as kinetic energy is lost (blue curve 402). The resulting increase in plume temperature is mitigated by plume cooling to ambient temperature due to dilution. The product of kinetic energy loss to heat with the mass ratio of exhaust jet in the plume gives the temperature change from kinetic energy after dilution (gray curve 404). The curvature shown in the mixing line from FIG. 1 is partly driven by this effect. The area under the gray curve is proportional to the mixing line curvature away from the linear reference. This in turn dictates the local slope at the bottom of the mixing line that is critical for determining contrail formation.

In a linearized model, all kinetic energy is converted to heat instantaneously at the exhaust nozzle and then reduced following the mass ratio of the exhaust jet in the plume. The area under this curve is twice the area under the curve of temperature change from kinetic energy after dilution, causing excess curvature of the mixing line and overestimation of the plume temperature. A linearized model with the same area under the curve as the temperature change from kinetic energy after dilution there employs scaling factor (e.g., k=0.5) to generate a scaled kinetic energy term expressed as:

$$((k*1/2((V_{Aj}-V)^2+(V_{TJ})^2)));$$

$$((0.5*1/2((V_{Aj}-V)^2+(V_{TJ})^2)));$$

and therefore, $$((1/4((V_{Aj}-V)^2+(V_{TJ})^2)))$$

Returning to FIG. 3, an contrail engine efficiency parameter (noverall_λ) is determined based, at least in part, on the additional energy flow out of the engine and the exhaust plume temperature scaling factor (k) at operation 308. According to a non-limiting embodiment, the contrail engine efficiency parameter (noverall_λ) is defined as follows:

$$\eta_{overall} = 1 - \frac{\dot{m}_j \cdot \left(h_j - h_i + \frac{1}{4}((V_{Aj}-V)^2 + V_{Tj}^2)\right)}{\dot{m}_f \cdot LHV}$$

where, $\dot{m}_j$=mass flow rate of the jet at the engine nozzle; $h_j$=enthalpy of the jet exhaust at engine nozzle; $h_i$=enthalpy of inlet air; $V_{Aj}$=axial and tangential velocity of the plume; V=forward flight velocity of the aircraft; $V_{Tj}$=axial and tangential velocity of the engine; $\dot{m}_f$=mass flow rate of fuel; and LMV=lower heating value of fuel (BTU/lbm).

According to one or more non-limiting embodiments, an aircraft engine residual fuel energy can be determined using the contrail engine efficiency parameter (noverall_λ) as: (1−noverall_λ).

At operation 310, an improved Schmidt-Appleman equation (Gλ[psi/° F.]) is generated based, at least in part, on the contrail engine efficiency parameter (noverall_λ). According to a non-limiting embodiment, the Schmidt-Appleman equation is expressed as follows:

$$G_\lambda\left[\frac{\text{psi}}{\circ \text{F.}}\right] =$$

$$\frac{e_p - e_E}{T_p - T_E} \approx \frac{\left[\frac{w_f \cdot EI_{H_2O}}{w_a} \cdot \frac{P_{amb}}{\varepsilon}\right]}{\left[\frac{w_f \cdot LHV}{w_a} \cdot \frac{(1-\eta_{overall})}{C_p}\right]} = \frac{C_p \cdot P_{amb}}{\varepsilon} \cdot \frac{1}{\left(1-\eta_{overall_\lambda}\right)} \cdot \frac{EI_{H_2O}}{LHV}$$

where, the aircraft engine residual fuel energy (1−noverall_λ) is based on the contrail engine efficiency parameter (noverall_λ) expressed as:

$$\eta_{overall} = 1 - \frac{\dot{m}_j \cdot \left(h_j - h_i + \frac{1}{4}((V_{Aj}-V)^2 + V_{Tj}^2)\right)}{\dot{m}_f \cdot LHV}$$

With continued reference to FIG. 3, the engine performance model parameters, the operating conditions, and the additional energy flow parameters are input to the improved Schmidt-Appleman equation (Gλ[psi/° F.]) to determine an more accurate mixing line slope at operation 312. Accordingly, an improved alignment over broad engine operating conditions between the improved mixing line slope and a physics-based 1-dimensional plume model can be achieved. At operation 314, the minimum humidity required for formation and persistence of contrails generated by the engine is evaluated based on the more accurate mixing line slope, and the method ends at operation 316.

The improved mixing line slope generated by the improved Schmidt-Appleman equation (Gλ[psi/° F.]) can be used to generate contrail formation and persistence maps by evaluating the minimum humidity required for formation and persistence over the engine operating envelope of a given aircraft engine. Referring to FIGS. 5A-5B in combination with FIG. 6, a method of determining a minimum humidity necessary to form contrails is illustrated according to a non-limiting embodiment. The method begins at operation 500, and at operation 502 an engine performance model of a given engine is evaluated at desired operating condition, but with zero humidity. The operating conditions include, but are not limited to, altitude, ambient temperature, Mach number, and power setting. At operation 504, an improved Schmidt-Appleman mixing line slope is determined based on contrail engine efficiency parameter (noverall_λ) and improved Schmidt-Appleman equation (Gλ). According to a non-limiting embodiment, the heat capacity of air is defined for ambient temperature and humidity, and the water emissions index and LHV of the fuel is consistent with the engine performance model.

At operation 506, a tangency temperature value is determined. The tangency temperature value is the temperature at which the slope of the saturation limit with respect to water versus temperature is the same as the improved Schmidt-Appleman mixing line slope (i.e., determined at operation 504). In some non-limiting embodiments the tangency temperature value can be generated analytically, and other non-limiting embodiments the tangency temperature value can be generated numerically. At operation 508, the partial pressure of water at the tangency temperature (i.e., determined at operation 506) on the mixing line is evaluated using the improved Schmidt-Appleman mixing line slope (i.e., determined in step 504) starting from the ambient temperature and zero humidity. At operation 510, the saturation limit with respect to water at the tangency temperature value is determined.

Turning to operation 512, a difference (Δ) between partial pressure of water at the saturation limit (i.e., determined at operation 510) and the partial pressure of water at the tangency temperature value (i.e., determined at operation 508) is determined. In one or more non-limiting embodiments, the difference (Δ) is set to zero if the difference is a negative value. At operation 514, the saturation limit with respect to water at the ambient temperature is determined. Accordingly, a minimum relative humidity for a contrail to form is determined at operation 516 as a ratio of the Δ (i.e., determined at operation 512) to the saturation limit with respect to the water (i.e., determined at operation 514). At operation 518, a saturation limit with respect to ice at ambient temperature is determined. At operation 520, a minimum relative humidity for a contrail to persist is determined at operation 520 as a ratio of the saturation limit with respect to ice (i.e., determined at operation 518) to the saturation limit with respect to water (i.e., determined at operation 514). At operation 522, the minimum relative humidity for a contrail to form and persist is determined as a the greater of the minimum relative humidity for a contrail to form (i.e., determined at operation 516) and the minimum relative humidity for a contrail to persist (i.e., determined at operation 520), and the method ends at operation 524. Accordingly, the method illustrated in FIGS. 5A and 5B generates maps shown in FIG. 7 indicating the formation and persistence humidity thresholds versus altitude across the envelope of the aircraft engine.

According to a non-limiting embodiment, the method illustrated in FIGS. 5A and 5B can also be adapted to compute a map of minimum temperature margin to the dew point over the engine operating envelope. For example, FIG. 8 in combination of FIG. 9 depict a method of determining a minimum temperature necessary to form contrails by a given aircraft engine at a given humidity according to a non-limiting embodiment. The method begins at operation 800, and an engine performance model at desired operating condition is determined at operation 802. The operating conditions include, but are not limited to, altitude, ambient temperature, Mach number, humidity, and power setting. At operation 804, an improved Schmidt-Appleman mixing line slope is determined based on contrail engine efficiency parameter (noverall_λ) and improved Schmidt-Appleman equation (Gλ). According to a non-limiting embodiment, the heat capacity of air is defined for ambient temperature and humidity, and the water emissions index and LHV of the fuel is consistent with the engine performance model. At operation 806, a tangency temperature value is determined. The tangency temperature value is indicative of a temperature at which the slope of the saturation limit with respect to water versus temperature is the same as the improved Schmidt-Appleman mixing line slope (i.e. determined at operation 804). In some non-limiting embodiments the tangency temperature value (e.g., temperature slope) can be generated analytically, and other non-limiting embodiments the tangency temperature value can be generated numerically.

Turning to operation 808, the partial pressure of water at the saturation limit with respect to water at the tangency temperature value (i.e., determined at operation 806) is determined. At operation 810, the temperature on the mixing line at this partial pressure of water (e.g., determined at operation 808) is determined. In one or more non-limiting embodiments, the temperature on the mixing line at the partial pressure of water is determined using the improved Schmidt-Appleman mixing line slope (i.e., determined at operation 804) starting from the desired operating conditions (i.e., determined at operation 802). At operation 812, the minimum temperature margin to dew point is determined as a difference between the temperature on the mixing line (i.e., determined at operation 810) minus tangency temperature value (i.e., determined at operation 806), and the method ends at operation 814. As described herein, dew point is the temperature the air needs to be cooled to (e.g., with respect to pressure) in order to achieve a relative humidity (RH) of 100%. Accordingly, the method illustrated in FIG. 8 can generate maps of the minimum temperature margin to dew point versus altitude over the engine operating envelope of the aircraft engine as shown, for example, in FIG. 10.

With reference now to FIG. 11, a block diagram of an example computer system 1200 configured to execute the example machine readable instructions for generating mapping contrail formation to engine performance characteristics to rapidly developing engine-specific contrail formation maps according to a non-limiting embodiment of the present disclosure. The computer 1200 can be, for example, a server, a personal computer, or any other type of computing device. The system 1200 of the instant example includes a processor 1210. For example, the processor 1210 can be implemented by one or more microprocessors or controllers from any desired family or manufacturer.

The processor 1210 includes a local memory 1215 and is in communication with a main memory including a read only memory 1230 and a random access memory 1220 via a bus 1240. The random access memory 1220 may be implemented by Synchronous Dynamic Random Access Memory (SDRAM), Dynamic Random Access Memory (DRAM), RAMBUS Dynamic Random Access Memory (RDRM) and/or any other type of random access memory device. The read only memory 1230 may be implemented by a hard drive, flash memory and/or any other desired type of memory device.

The computer 1200 also includes an interface circuit 1250. The interface circuit 1250 may be implemented by any type of interface standard, such as an Ethernet interface, a universal serial bus (USB), and/or a PCI express interface, and may interface with a network 1260.

One or more input devices 1254 are connected to the interface circuit 1250. The input device(s) 1254 permit a user to enter data and commands into the processor 1210. The input device(s) can be implemented by, for example, a keyboard, a mouse, a touchscreen, a track-pad, a trackball, and/or a voice recognition system. The interface 1250 may operate in conjunction with, in parallel with, or in place of, the operator interface 115.

One or more output devices 1258 are also connected to the interface circuit 1250. The output devices 1258 can be implemented by, for example, display devices for associated data (e.g., a liquid crystal display, a cathode ray tube display (CRT), etc.), and/or an actuator operatively associated with a fluid-based engineering system such as gas turbine engines for aviation and power generation, HVAC&R (heating, ventilation, air-conditioning and refrigeration), fuel cells, and other, more generalized fluid processing systems for hydrocarbon extraction, materials processing, and manufacture.

The various methods described herein can be used in a variety of applications. In the case of on-board real-time contrail prediction and detection, for example, engine data can be used directly to compute contrail maps with atmospheric data that is measured by other on-board sensors. In another example application, the engine performance models generated by the methods described herein can be used to pre-compute contrail maps that are used with weather forecasts to pre-compute contrail formation zones to be avoided in flight planning. In yet another example application, the methods described herein can generate contrail maps as part of aircraft or engine design systems and can be utilized to evaluate contrail climate impacts for designing a candidate engine to be operated under a set of pre-defined operating conditions.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A computer system including a processor having memory storing instruction, which when executed by the processor, controls the computer system to perform operations of determining a minimum humidity required for formation and persistence of contrails produced by an engine of an aircraft, the operations comprising:

determining engine performance model parameters of the engine at desired operating conditions with zero humidity;

determining additional energy flow out of the engine;

determining an exhaust plume temperature scaling factor;

determining a contrail engine efficiency parameter (noverall_λ) based on additional energy flow out of the engine and the exhaust plume temperature scaling factor;

generating an improved Schmidt-Appleman equation (Gλ) based on the contrail engine efficiency parameter (noverall_λ);

determining an improved mixing line slope based on the improved Schmidt-Appleman equation (Gλ); and determining the minimum humidity required for formation and persistence of contrails produced by the engine based on the improved mixing line slope;

controlling the engine to output exhaust that produces the formation and persistence of the contrails according to the improved mixing line slope.

2. The computer system of claim 1, wherein the engine performance model parameters include a residual fuel energy in the aircraft engine.

3. The computer system of claim 2, wherein the controller determines the residual fuel energy in the aircraft engine based on the contrail engine efficiency parameter (noverall_λ).

4. The computer system of claim 3, wherein the exhaust plume temperature scaling factor is 0.5.

5. The computer system of claim 4, wherein the additional energy flow includes power extraction and bleed offtakes used by an aircraft air management system and an electrical system of the aircraft.

6. A computer system including a processor having memory storing instruction, which when executed by the processor, controls the computer system to perform operations to generate contrail formation and persistence maps by evaluating the minimum humidity required for formation and persistence over the engine operating envelope of a given aircraft engine, the operations comprising:

determining engine performance model parameters of the aircraft engine at desired operating conditions with zero humidity;

determining a contrail engine efficiency parameter (noverall_λ);

determining an improved Schmidt-Appleman equation (Gλ) based on the contrail engine efficiency parameter (noverall_λ);

determining an improved mixing line slope based on the contrail engine efficiency parameter (noverall_λ) and the improved Schmidt-Appleman equation (Gλ);

determining a tangency temperature value at which the slope of a first saturation limit with respect to water vs temperature is the same as the improved mixing line slope;

determining a first partial pressure of water value at the tangency temperature based on the improved Schmidt-Appleman mixing line slope;

determining a second partial pressure of water value at a second saturation limit with respect to water at the tangency temperature;

determining a difference (Δ) between the second partial pressure of water and the first partial pressure of water value;

determining a third partial pressure of water at a third saturation limit with respect to water at the ambient temperature;

determining a minimum relative humidity for a contrail to form as a first ratio of the difference (Δ) with respect to water;

determine a fourth saturation limit with respect to ice at the ambient temperature;

determining a minimum relative humidity for the contrail to persist as a second ratio of the fourth saturation limit to the third saturation limit;

determining the minimum relative humidity for the contrail to form and persist as the greater of the first ratio and the second ratio; and generating exhaust from the aircraft engine that produces the formation and persistence of the contrail based on the minimum relative humidity.

7. The computer system of claim 6, wherein the engine performance model parameters include a residual fuel energy in the aircraft engine.

8. The computer system of claim 7, wherein the controller determines the residual fuel energy in the aircraft engine based on the contrail engine efficiency parameter (noverall_λ).

9. The computer system of claim 8, wherein the exhaust plume temperature scaling factor is 0.5.

10. The computer system of claim 9, wherein the additional energy flow includes power extraction and bleed offtakes used by an aircraft air management system and an electrical system of the aircraft.

11. The computer system of claim 10, wherein determining the first partial pressure of water value is based on the improved Schmidt-Appleman mixing line slope starting from an ambient temperature and zero humidity.

12. The computer system of claim 11, wherein determining the difference (Δ) is set to zero when the difference (Δ) is negative.

13. The computer system of claim 6, wherein the processor computes the tangency temperature value is analytically.

14. The computer system m of claim 6, wherein the processor computes the tangency temperature value is numerically.

15. A computer system including a processor having memory storing instruction, which when executed by the processor, controls the computer system to perform operations of determining a minimum humidity necessary to form contrails by an engine of an aircraft, the operations comprising:

determining engine performance model parameters of the engine at desired operating conditions;

determining a contrail engine efficiency parameter (noverall_λ);

determining an improved Schmidt-Appleman equation (Gλ) based on the contrail engine efficiency parameter (noverall_λ);

determining an improved mixing line slope based on the contrail engine efficiency parameter (noverall_λ) and the improved Schmidt-Appleman equation (Gλ);

determining a tangency temperature value at which the slope of a first saturation limit with respect to water vs temperature is the same as the improved mixing line slope;

determining a partial pressure of water at the first saturation limit with respect to water at the tangency temperature;

determining a first temperature at the partial pressure of water based on the improved mixing line slope;

determining a minimum temperature margin with respect to dew point based on the temperature at the partial pressure and the tangency temperature value;

determining the minimum humidity necessary to form contrails by the engine based on the minimum temperature margin with respect to the dew point; and generating exhaust from the aircraft engine that produces the formation and persistence of the contrail based on the minimum humidity.

16. The computer system 15, wherein determining the temperature at the partial pressure of water includes determining the temperature at the partial pressure of water starting from the desired operating conditions.

17. The computer system 16, wherein the contrail engine efficiency parameter (noverall_λ) comprises:

determining an exhaust plume temperature scaling factor that scales a kinetic energy of the engine by a factor 0.5; and applying the exhaust plume temperature scaling factor to the contrail engine efficiency parameter (noverall_λ).

18. The computer system 16, wherein the minimum temperature margin with respect to dew point is a difference between the temperature at the partial pressure and the tangency temperature.

19. The computer system of claim 15, wherein the processor computes the tangency temperature value analytically.

20. The computer system of claim 15, wherein the processor computes the tangency temperature value is numerically.

* * * * *